(12) United States Patent
Iwami et al.

(10) Patent No.: US 6,778,904 B2
(45) Date of Patent: Aug. 17, 2004

(54) ON-VEHICLE NAVIGATION SYSTEM

(75) Inventors: Ryotaro Iwami, Kobe (JP); Nobuyuki Nakano, Katano (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 171 days.

(21) Appl. No.: 10/073,201

(22) Filed: Feb. 13, 2002

(65) Prior Publication Data

US 2002/0111738 A1 Aug. 15, 2002

(30) Foreign Application Priority Data

Feb. 14, 2001 (JP) ........................................ 2001-036524

(51) Int. Cl.$^7$ ................................................ G01C 21/34
(52) U.S. Cl. .................. 701/211; 701/209; 340/995.19; 340/995.27
(58) Field of Search ................................ 701/202, 209, 701/210, 211; 340/995.19, 995.2, 995.26, 995.27

(56) References Cited

U.S. PATENT DOCUMENTS

| | | | |
|---|---|---|---|
| 5,774,828 A | * | 6/1998 | Brunts et al. ................ 701/210 |
| 6,219,614 B1 | * | 4/2001 | Uchigaki et al. ............ 701/211 |
| 6,333,702 B1 | * | 12/2001 | Hiyokawa et al. ...... 340/995.21 |
| 6,336,073 B1 | * | 1/2002 | Ihara et al. .................. 701/202 |
| 6,374,183 B1 | * | 4/2002 | Oshida et al. ............... 701/211 |
| 6,415,224 B1 | * | 7/2002 | Wako et al. ................. 701/208 |
| 6,542,814 B2 | * | 4/2003 | Polidi et al. ................. 701/208 |
| 6,571,169 B2 | * | 5/2003 | Miyaki ........................ 701/200 |
| 6,622,089 B2 | * | 9/2003 | Hasegawa et al. .......... 701/211 |

FOREIGN PATENT DOCUMENTS

JP          6-068386         3/1994

OTHER PUBLICATIONS

"Turn–by–Turn Displays Versus Electronic Maps: An On–the–Road Comparison of Driver Glance Behavior" (The University of Michigan Transportation Research Institute, Report No., UMTRI–98–37, Jan. 1999, p. iii).

\* cited by examiner

Primary Examiner—Gary Chin
(74) Attorney, Agent, or Firm—Wenderoth, Lind & Ponack, L.L.P.

(57) ABSTRACT

A turn-by-turn on-vehicle navigation system is capable of providing drivers with helpful and appropriate information to free them from their various anxieties caused as a result of relatively less information on a display. When the vehicle's current position is located on a recommended route after the completion of a certain guidance the driver is determined as properly driving the vehicle as expected, and receives a message telling that he/she is on the right track. With such a message, the driver does not feel anxiety that often occurs when making a turn at an intersection. Further, when the vehicle passes by a predetermined landmark located at close range, supplemental information is provided for the location. Such information removes the driver's uneasiness when he/she keeps going straight along the same road for a long time. Still further, at the destination, information about the area is provided. Thereby, the driver can feel secure even if he/she is new to the area.

7 Claims, 5 Drawing Sheets

ON-VEHICLE NAVIGATION SYSTEM

BACKGROUND OF THE INVENTION

1. Field of the Invention

The present invention relates to on-vehicle navigation systems for guiding a vehicle on which route to take and, more specifically, to on-vehicle navigation systems for providing such a route guidance not with a map, but simply using characters and symbols only.

2. Description of the Background Art

On-vehicle navigation systems currently available are broadly classified into two types: one is a multi-function type coming with a high-performance display, combined with television capabilities, capable of displaying characters, graphics, drawings, and others in many colors with high definition; and the other is a type carrying indispensable functions only, and a display coming therewith merely displays characters and symbols simply. With the former type of on-vehicle navigation system, the route guidance provided thereby to an arbitrary destination is driver-friendly, i.e., the driver can easily acknowledge where he/she currently is by a vehicle mark on the displayed map, a recommended route is displayed in a different color, and an enlarged map is displayed at the corresponding intersection. Further, if a traffic jam occurs, relating information is displayed in characters, and the driver also sees a mark indicating the traffic jam at the corresponding location on the map. As such, the multi-function on-vehicle navigation system with a high-performance display can provide the driver with any needed information in an easily perceivable manner.

On the other hand, the latter type of on-vehicle navigation system being popular in the US provides route guidance using no map, but numeric values and arrows to indicate the remaining distance to the destination, the heading direction at the intersection, and the like. In this sense, such guidance is called turn-by-turn guidance.

The turn-by-turn guidance does not require the display to be high in performance, advantageously reducing the cost of the navigation system in a turn-by-turn mode. Moreover, the turn-by-turn display shows minimum information only, consequently the driver glances at the display less often. Such a turn-by-turn on-vehicle navigation system thus does not distract the driver as much as the multi-function on-vehicle navigation system, beneficially leading to safer driving.

As to a difference, in terms of the display screen, between the multi-functional navigation system and the turn-by-turn navigation system, refer to exemplary display screens in "Turn-by-Turn Displays versus Electronic Maps: An On-the-Road Comparison of Driver Glance Behavior" (The University of Michigan Transportation Research Institute, Report No. UMTRI-98-37, January 1999, p. III).

The issue here is that the turn-by-turn display often causes the driver to feel insecure because guidance information provided thereby is kept to a minimum.

To be more specific, the driver often feels insecure about specifying at which intersection a displayed arrow is directing him/her to make a turn, e.g., a right turn. Especially in a case where intersections appear one after another in a close range, e.g., in a downtown area, the distance to the target intersection, if displayed, is not helpful enough. Even if the turn-by-turn display shows intersection names or road names, such name signs are not always posted at the actual intersections. Even after barely specifying the target intersection, if its structure is complicated, e.g., five roads are extending therefrom, and two are respectively directed rightward at 90 and 150 degrees, the driver may again have difficulty in specifying, this time, which road to take. In such a case, even if an arrow showing the corresponding angle is displayed, the driver has a difficulty in deciding which road to take, and continues to feel insecure.

After making a turn at an intersection, or going through an intersection complicated in structure without full confidence, the driver often becomes skeptical about "Was I supposed to make a turn there?" or "Am I on the right track?".

If the driver made a wrong turn by mistake, both types of on-vehicle navigation systems notify him/her of the mistake by means of a warning display or sound, automatically find a new route to the destination, or the like. For the driver on the right track, the multi-function navigation system can assure him/her with a vehicle mark displayed on the recommended route. However, the turn-by-turn navigation system offers the driver no assurance of being on the right track, making him/her wonder "Am I heading in the right direction? No warning yet?".

Especially when the driver just needs to keep going straight along the same road for a while, e.g., in a suburb, he/she will be get anxious about "Am I supposed to keep going this road?" because no information is to be provided by the turn-by-turn display for the duration of time.

The driver's anxiety may be increased if the road suddenly looks different, e.g., abruptly becomes narrow, curves 90 degrees, becomes unpaved. In such a case, the driver may wonder "Did I stray into the wrong road?" even though he/she is driving properly.

Moreover, the driver will not be free from anxiety after reaching the destination if he/she is new to the area, not knowing what to do and where to go.

That is, when the driver reaches the destination, the map of the area remains displayed if the navigation system is of the multi-function type, and the driver can obtain diverse kinds of information about the area, at least of the displayed range. With the turn-by-turn display, however, the driver will be guided to the destination, but not be provided with information about the area.

SUMMARY OF THE INVENTION

Therefore, an object of the present invention is to provide turn-by-turn on-vehicle navigation systems capable of providing drivers with helpful and appropriate information to free them from their various anxieties as discussed above.

The present invention has the following features to attain the object above.

A first aspect of the present invention is directed to an on-vehicle navigation system which provides guidance not with map display, but simply with one or more characters and/or one or more symbols. This system comprises: a data storage section for storing map data; an input section through which a destination is inputted; a position detection section for detecting a current position of a vehicle; a route search section for finding a recommended route from the current position to the destination using the map data; a guidance data generation section for generating, from the map data and the recommended route, guidance data needed for the guidance; a guidance section for providing the guidance in a manner based on the guidance data and the current position; and an output section for making a display output and/or a sound output about the guidance provided by the guidance section. Herein, when the current position of the vehicle is on the recommended route after passing a guidance point, the guidance section provides a message telling that the vehicle is driving properly.

As described above, in the first aspect, the driver is notified of his/her proper turn at the target intersection after completion of the corresponding guidance. Such a notification frees the driver from feelings of anxiety even after making a proper turn at the target intersection, wondering if he/she is on the right track. Notifying the driver in a more clear manner as "turned properly", the driver can feel relieved to a greater degree.

A second aspect of the present invention is directed to an on-vehicle navigation system which provides guidance not with map display, but simply with one or more characters and/or one or more symbols. This system comprises: a data storage section for storing map data; an input section through which a destination is inputted; a position detection section for detecting a current position of a vehicle; a route search section for finding a recommended route from the current position to the destination using the map data; a guidance data generation section for generating, from the map data and the recommended route, guidance data composed of guidance information needed for the guidance, and area information corresponding to a predetermined point in the vicinity of the recommended route; a guidance section for providing the guidance in a manner based on the guidance data and the current position; and an output section for making a display output and/or a sound output about the guidance provided by the guidance section. Herein, the guidance section provides the guidance according to the area information when the vehicle passes by the predetermined point.

As described above, in the second aspect, the driver can see or hear information about the area in the vicinity of the recommended route on which he/she is driving. This gives the driver assurance of driving on the recommended route, and thus he/she can feel better about driving.

A third aspect of the present invention is directed to an on-vehicle navigation system which provides guidance not with map display, but simply with one or more characters and/or one or more symbols. This system comprises: a data storage section for storing map data; an input section through which a destination is inputted; a position detection section for detecting a current position of a vehicle; a route search section for finding a recommended route from the current position to the destination using the map data; a guidance data generation section for generating, from the map data and the recommended route, guidance data composed of guidance information needed for the guidance, and predetermined destination information about the destination and therearound; a guidance section for providing the guidance in a manner based on the guidance data and the current position; and an output section for making a display output and/or a sound output about the guidance provided by the guidance section. Herein, the guidance section provides the guidance according to the destination information when the vehicle reaches the destination.

As described above, in the third aspect, the driver is provided with information about the destination after reaching it. Such information helps the driver get to know the area easily even if he/she has never been to the area before.

Here, the guidance section in each aspect may provide the message telling that the vehicle is driving properly by referring to a level of satisfaction based on a proximity factor derived from distances from the current position of the vehicle to the recommended route, and to another route closer thereto.

In such a manner, if the message refers to the satisfaction level such as "turned properly with a satisfaction level of x%", the driver himself/herself can judge his/her driving.

In the first aspect, preferably, the guidance data generation section may be so configured as to generate the guidance data including area information corresponding to a predetermined point in the vicinity of the recommended route together with guidance information needed for the guidance, and when the vehicle passes by the predetermined point, the guidance section may be so configured as to further provide the guidance in a manner based on the area information.

Further, in the first aspect, the guidance data generation section maybe so configured as to generate the guidance data including predetermined destination information about the destination and therearound together with guidance information needed for the guidance, and when the vehicle reaches the destination, the guidance section maybe so configured as to further provide the guidance in a manner based on the destination information.

Still further, in the first aspect, the guidance data generation section may be so configured as to generate the guidance data including area information corresponding to the predetermined point in the vicinity of the recommended route, and predetermined destination information about the destination and therearound together with guidance information needed for the guidance, and the guidance section may be so configured as to further provide the guidance in a manner based on the area information when the vehicle passes by the predetermined point, and the guidance in a manner based on the destination information when the vehicle reaches the destination.

With such configurations, the guidance can be provided in a combined manner with the first to third aspects, thereby synergizing the above described effects.

These and other objects, features, aspects and advantages of the present invention will become more apparent from the following detailed description of the present invention when taken in conjunction with the accompanying drawings.

DESCRIPTION OF THE PREFERRED EMBODIMENT

Below, an embodiment of the present invention is described by referring to the accompanying drawings.

Figure 1:
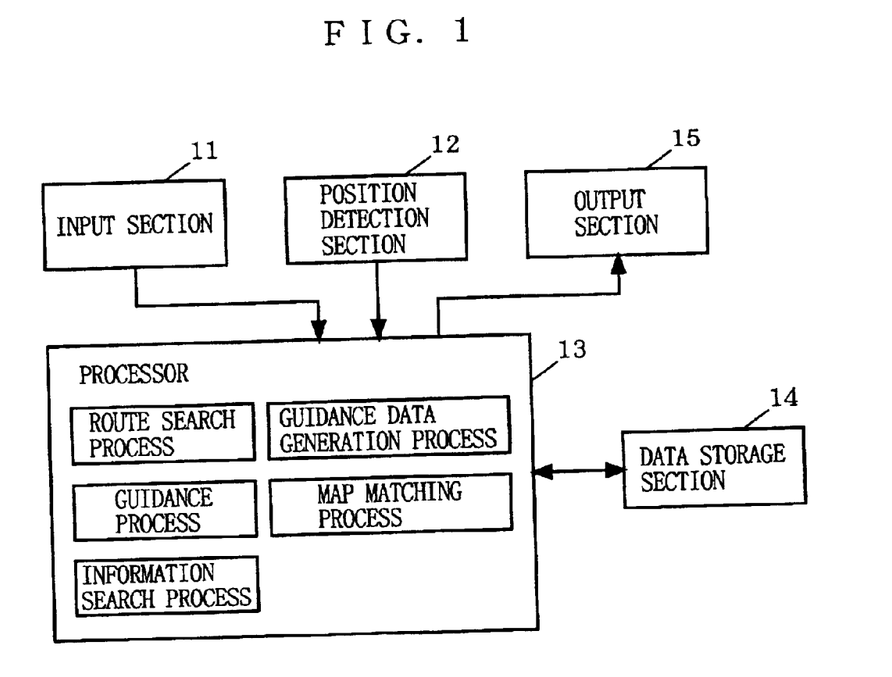
FIG. 1 is a block diagram showing the structure of a turn-by-turn on-vehicle navigation system according to one embodiment of the present invention.

FIG. 1 is a block diagram showing the structure of a turn-by-turn on-vehicle navigation system according to the embodiment of the present invention. In FIG. 1, the on-vehicle navigation system includes an input section 11, a position detection section 12, a processor 13, a data storage section 14, and an output section 15.

The input section 11 is composed of a controller for operating the on-vehicle navigation system, a microphone for sound acquisition, or the like. Through operation of the controller, destination setting and information searching are performed for route search. Speaking into the microphone will almost-equivalently substitute for such a controller operation. The resultant operation information or sound information respectively derived thereby is forwarded to the processor 13.

The position detection section 12 is composed of a vehicle speed sensor, a gyro sensor, a GPS receiver, and the like. The vehicle speed sensor detects a driving speed of the vehicle, the gyro sensor detects in which direction the vehicle is heading, and the GPS receiver detects an absolute position of the vehicle on the earth. The resultant information derived thereby is used by the processor 13 for a map matching process to correctly adjust the vehicle's current position onto a map road.

The processor 13 goes through various processes, e.g., route search, guidance data generation, guidance, map matching, information search. Specifically, in the route search process, derived is a recommended route from the vehicle's current position to a destination which is designated by the input section 11. Based on the derived recommended route, generated in the guidance data generation process is guidance data, which is used to indicate the heading direction at each intersection, for example. In accordance with the guidance data, in the guidance process, route guidance is provided as appropriate. In the map matching process, based on the information detected by the position detection section 12, the vehicle's current position is correctly adjusted if deviated from the map road. In the information search process, any specific location (destination) is searched using a database based on a zip code, an address, a phone number, a category, or a name, whatever is inputted. The database is previously provided in the data storage section 14.

The data storage section 14 is composed of a CD-ROM, DVD-ROM, memory, or the like, and previously stores any data (hereinafter, map data) required for route search and information display, for example. Such map data is used as appropriate in the processes to be executed by the processor 13.

The output section 15 is composed of a display, and a speaker. The display is exemplified by a turn-by-turn display, which is not capable of displaying maps, but only simply characters and symbols. The speaker is equipped to provide the driver with any needed information by sound during route guidance.

Referring to FIGS. 2 to 8, described next is a manner of providing the guidance by the on-vehicle navigation system of the above structure.

Figure 2:
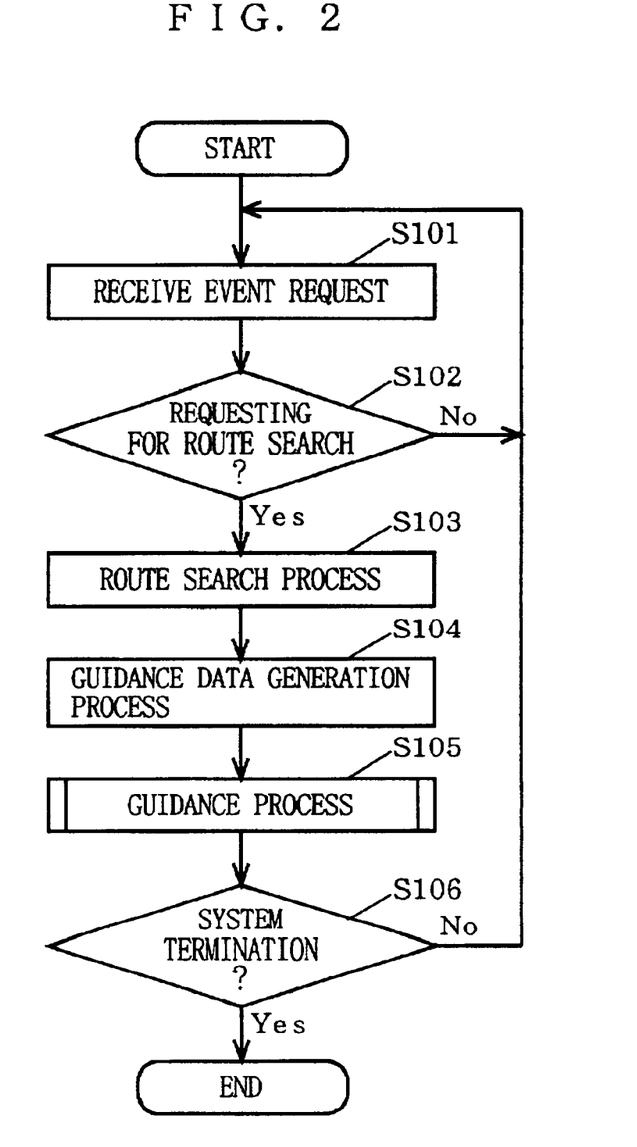
FIG. 2 is a flowchart of a process executed in the on-vehicle navigation system of the embodiment.
Figure 3:
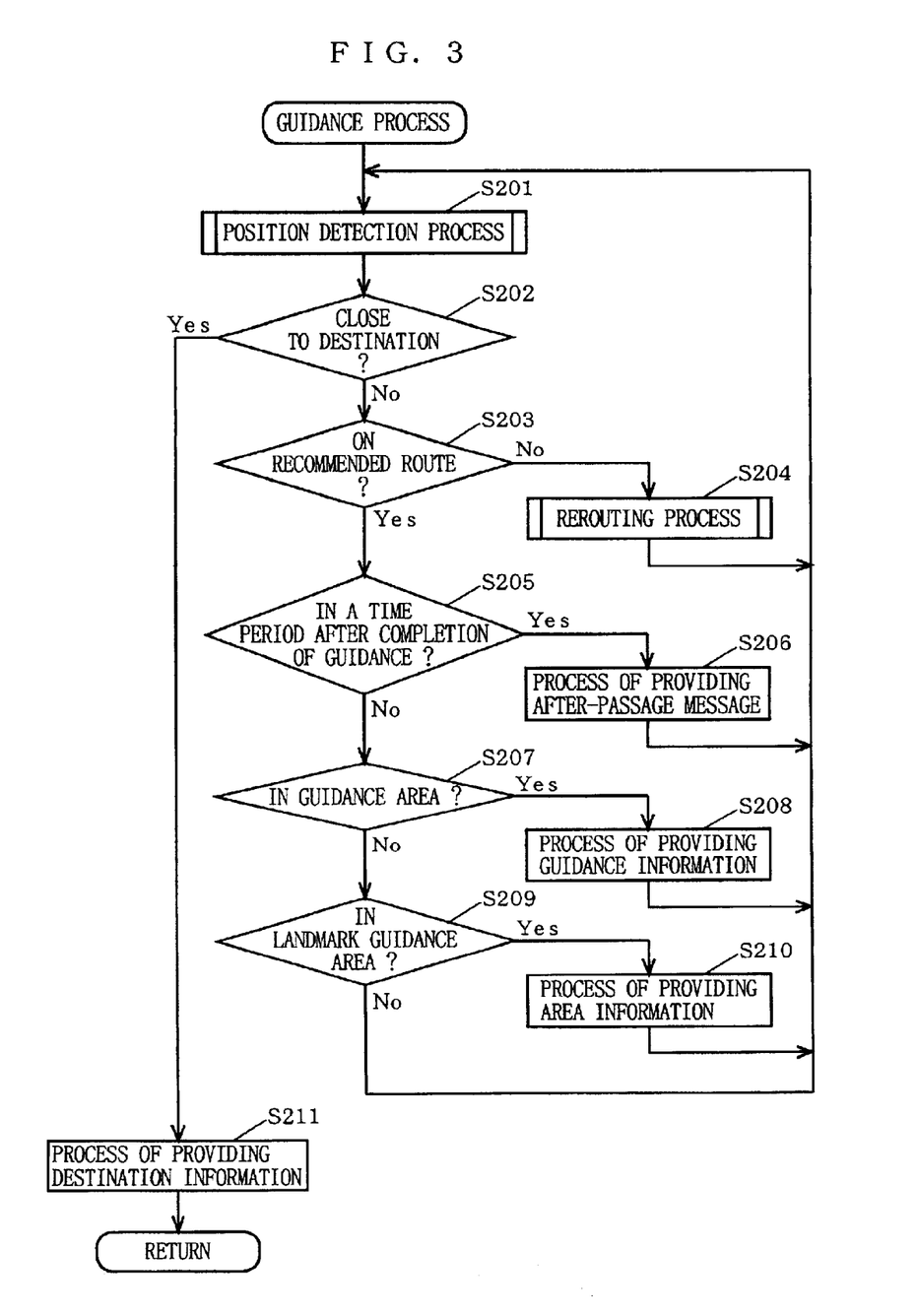
FIG. 3 is a detailed flowchart of a guidance process in step S105 of FIG. 2.
Figure 4:
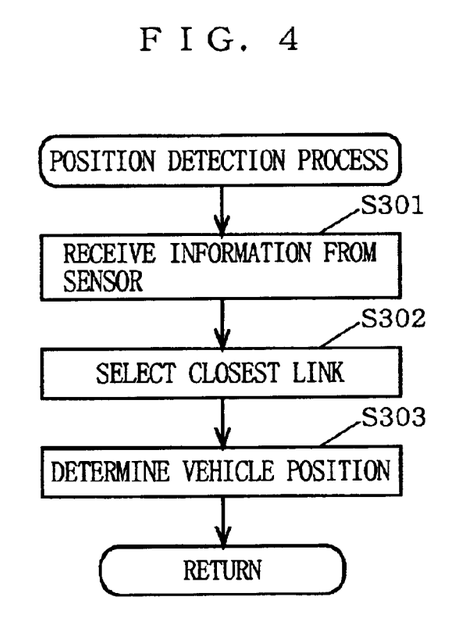
FIG. 4 is a detailed flowchart of a position detection process in step S201 of FIG. 3.
Figure 5:
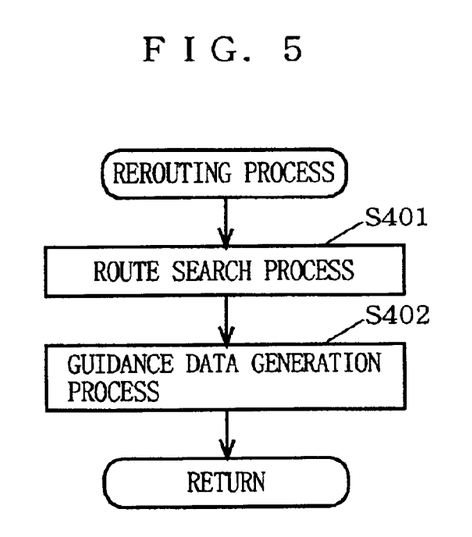
FIG. 5 is a detailed flowchart of a rerouting process in step S204 of FIG. 3.
Figure 6:
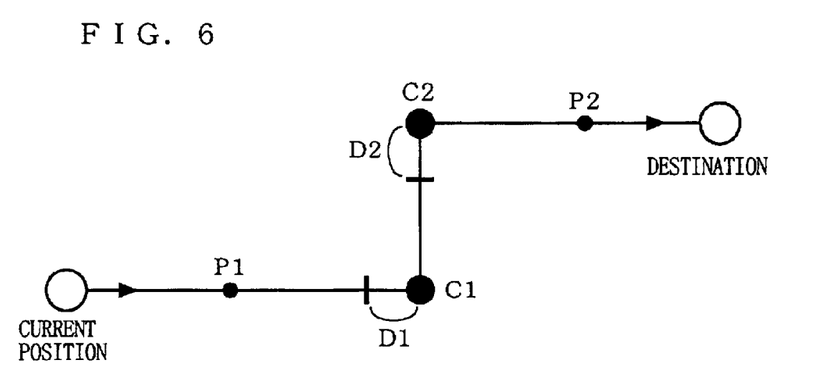
FIG. 6 conceptually illustrates exemplary guidance data to be generated in a processor 13.

FIG. 2 is a flowchart of the processes executed in the on-vehicle navigation system of the present embodiment. FIG. 3 is a detailed flowchart of the guidance process in step S105 of FIG. 2; FIG. 4 is a detailed flowchart of a position detection process in step S201 of FIG. 3; and FIG. 5 is a detailed flowchart of a rerouting process in step S204 of FIG. 3. FIG. 6 conceptually illustrates exemplary guidance data to be generated in a processor 13, and FIGS. 7 and 8 both illustrate an exemplary manner of calculating a proximity factor x.

Referring to FIG. 2, the comprehensive operation of the on-vehicle navigation system is described first.

A request made for a driver-definable event, e.g., information search or route search, is received by the input section 11 (step S101). The input section 11 then determines whether or not the requested event is a route search, and if YES, forwards the event request to the processor 13 (step S102). In response thereto, with information about the vehicle's current position received from the position detection section 12, the processor 13 goes through the route search process to find a recommended route from the current position to a destination, which is included in the event request (step S103). Here, the destination is the one searched using the data base provided in the data storage section 14 based on an address, a phone number, or a facility name, whichever is inputted into the input section 11. The route search process is executed in accordance with the well-known Dijkstra's algorithm, for example.

After finding the recommended route, the processor 13 then goes through the guidance data generation process, and generates guidance data carrying any information needed for guiding the user along the recommended route (step S104). The guidance data is described in detail below. According to the guidance data, the processor 13 correspondingly provides guidance from the current position to the destination, and specifically, displays or sound-outputs characters and simple drawings via the output section 15 (step S105), details of which are left for later description. Until system termination, e.g., until an event request for power OFF comes from the input section 11, these processes are repeatedly executed (step S106).

Referring to FIG. 6, the guidance data is now described in detail.

The guidance data contains the recommended route from the current position to the destination, together with any information needed for route guidance. Specifically, such information includes guidance information and area information.

The guidance information is about an intersection(s) (guiding point(s)) on the recommended route at which the driver is supposed to make a turn. The guidance information is composed of, on an intersection basis, an intersection name, a direction to turn, a distance to the intersection, names of the intersecting roads, and the like. With the exemplary recommended route shown in FIG. 6, the guidance information is provided separately for intersections C1 and C2. Sections D1 and D2 in the drawing each indicate an area for providing guidance for the intersections C1 and C2, respectively. When the vehicle is driving in the section D1, the driver sees or hears the guidance about the intersection C1 for the duration of time. Information about such sections is also a part of the guidance data.

With the area information, the driver is assured that he/she is driving on the correct road, i.e., recommended route, in a time period when no specific guidance information is provided. The area information is not always necessary for driving, but is useful if provided to know what is going on in the area, e.g., "we are passing close by X Bank", "we are going through Y Intersection", "we are going under the viaduct", "we are driving on the two-way four-lane road", or "Supermarket Z is coming into sight on the right side toward the front". The timing for providing the area information at which position or with which landmark can be freely set, preferably prominent buildings easy to spot even during driving may be used for the purpose. With the exemplary recommended route of FIG. 6, points P1 and P2 are previously set to see the timing of providing the area information, and when the vehicle passes thereby, the corresponding area information is to be provided.

Preferably, the area information will be optimally set with the following driving conditions considered:

(1) Provide area information differently depending on the time.

At nighttime, due to lower visibility, provide the area information more frequently than during the daytime. Also, select closer landmarks for reference in the area information, e.g., "we are now passing by a convenience store". On the other hand, the landmarks to be set for daytime are those located further away, e.g., "the Tokyo Tower is now in sight on the right hand side toward front". Such settings can be realized by additionally using a clock or a brightness sensor, or the like.

(2) Provide area information differently depending on the weather.

On bad-weather days, e.g., rainy days, provide the area information by referring to closer landmarks due to lower visibility, and on good-weather days, by referring to landmarks that are located further away. Such settings can be realized by additionally using a sensor with which weather forecast is possible, e.g., a humidity sensor, or the like.

(3) Provide area information depending on the driver's psychological state.

When the driver is in a hurry and the vehicle speed is high, provide the area information referring in detail to landmarks located farther away than usual, e.g., "After making a turn at the next intersection, please make a right turn at the third intersection, and keep going along the road for 400 meters. You will see a gas station, and estimated arrival time is 40 seconds from now". Such settings can be realized by the driver selecting a predetermined "rush mode", for example.

Referring to FIG. 3, described next is the guidance process.

First, the position detection section 12 detects the vehicle's current position using information detected by various sensors, e.g., information about driving speed, heading direction, longitude/latitude coordinates on the earth, and the like (step S201).

This position detection process is executed based on the flowchart of FIG. 4. First, a point indicated by the longitude/latitude coordinates is set as a detection point (step S301). Next, according to the detection point, the heading direction, and the driving speed, a road closest to the detection point (closest link) is selected from the map data stored in the data storage section 14 (step S302). Lastly, a perpendicular from the detection point to the closest link is dropped, and the resultant intersection point is determined as the vehicle position (step S303).

The processor 13 then determines whether or not the current position thus detected in step S201 is close to the destination (step S202). If not, it means that the guidance is to continue, and thus the procedure goes to steps S203 to S210 as appropriate.

Specifically, determined first is whether or not the current position is on the recommended route (step S203). If not, the vehicle is determined as being off the route, and the procedure goes to step S204 for a rerouting process of carrying out the route search again. After finding a new recommended route, the guidance data carrying any information needed for guiding the newly found route is generated in a similar manner to the above data generation process in step S104 (FIG. 5, steps S401 and S402).

If the current position is on the recommended route, determined next is, at the point in time, whether or not certain guidance has been just completed (step S205). The determination factor herein is the timing of determination in step S205 as being immediately after the completion of the guidance. Here, the term "just" broadly refers to a short time range, and thus the determination timing may also be shortly after the completion of the guidance. More specifically, with exemplary guidance about an intersection, when the vehicle is properly on the recommended route, the point in time when the vehicle completely made a turn at the intersection is the determination factor. Therefore, if the determination made in step S205 is YES, the driver will see or hear a message (after-passage message) outputted by the output section 15 telling that he/she followed the guidance properly as expected (step 3206). The after-passage message provided at this time may be clear as "drove properly as guided", "turned properly at the intersection", or the like. Alternatively, the after-passage message may be "drove properly with a satisfaction level of x%", referring to a proximity factor x calculated as below.

Figure 7:
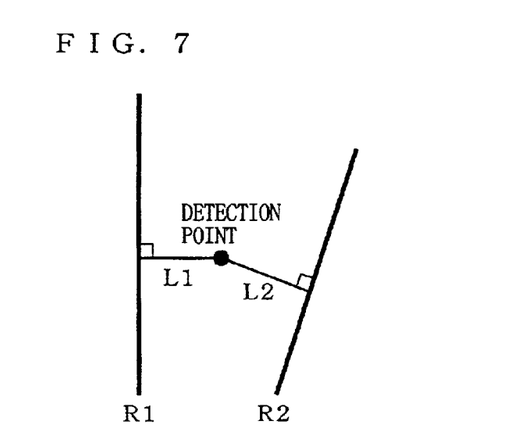
FIGS. 7 and 8 both illustrate an exemplary manner of calculating a proximity factor x.

To calculate the proximity factor x, in step S302 of the above described position detection process, a link R1 closest to the detection point, and a link R2 second closest thereto are first selected. Then, a perpendicular from the detection point both to the closest link R1 and the second closest link R2 is dropped, and the resultant perpendiculars are L1 and L2, respectively (FIG. 7). Using the perpendiculars L1 and L2, $x=L2/(L2+L1) \times 100$ is calculated to derive the proximity factor x.

Figure 8:
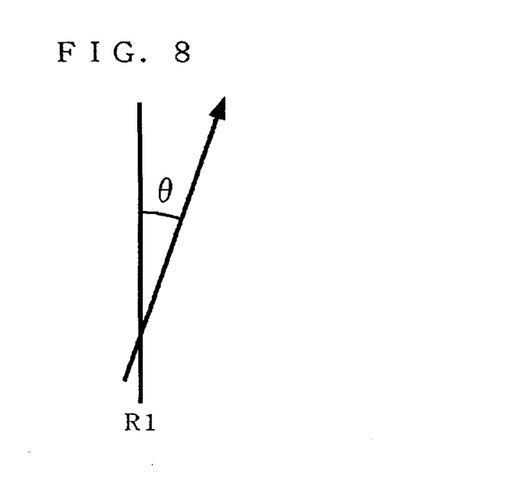

Alternatively, a drive vector using the heading direction and the driving speed calculated in step S301 of the position detection process, and then an angle θ which the drive vector forms with the closest link R1 on the recommended route are first derived (FIG. 8). Using the driving vector and the angle θ, calculate $x=(1-\theta/\pi) \times 100$ is calculated to derive the proximity factor x.

If the determination made in step S205 is NO, determined next is whether or not the current position is within a range of guidance area (step S207). Here, the guidance area is a specific area in which the driver is supposed to receive the corresponding guidance, e.g., in the vicinity of or in the intersection at which the driver needs to make a turn. For such determination, the guidance information provided together with the guidance data is used. If the current position is determined as being in the guidance area (in FIG. 6, for example, intersections C1 and C2, and sections D1 and D2), the driver sees or hears the distance to the target intersection, the name of the intersection, the turning direction, and the like (step S208). Such outputs are provided by the output section 15.

If the current position is determined as not being in the guidance area, determined next is whether or not the current position is within a range of a landmark guidance area (step S209). Here, the landmark guidance area is a specific area in which the driver is supposed to receive guidance when his/her vehicle comes closer to any arbitrary point about which no specific route guidance is given. For such determination, the area information provided together with the guidance data is used. If the current position is determined as being in the landmark guidance area (in FIG. 6, for example, points P1 and P2), the driver sees or hears the guidance by the output section 15 stating "we are passing close by a park", "we are going under a viaduct", or the like (step S210).

With such area information, the driver can feel secure about driving on the proper route when information is not sufficiently provided on the turn-by-turn display.

If the current position is determined as not being in the landmark guidance area in step S209, the procedure returns to step S201 to start all over again from the position detection process. The same is applicable after the rerouting process in step S204, after the process of providing the after-passage message in step S206, after the process of providing the guidance information in step S208, and after the process of providing the landmark guidance information in step S210.

On the other hand, in step S202, when the vehicle's current position is determined as being close to the destination, i.e., when the vehicle reaches the destination as a result of following the guidance, destination information is provided (step S211). Here, this destination information is not the information used to guide the driver to the destination, but therewith, the driver can know about the destination and there around in detail. More specifically, the destination information carries the direction and the distance from the starting point, the name of the closest station, tour spots in the area, town guide, cafe and restaurant information, and the like. If the destination is an event facility, information may be provided about a not-so-crowded entrance, or if the driver uses park-and-ride, information about where to take the shuttle bus or train is a possibility to be provided. To provide such information, the data base which is previously provided in the data storage section 14 may be used.

As described in the foregoing, with the turn-by-turn on-vehicle navigation system according to one embodiment of the present invention, the driver is notified that he/she turned properly after the completion of the guidance at the intersection. Such a notification frees the driver from feelings of anxiety even after turning properly at the target intersection, and wondering if he/she is on the right track. Notifying the driver in a more clear manner such as "turned properly", the driver can feel relieved to a greater degree. Further, if a satisfaction level is referred to such as "turned properly with a satisfaction level of x%", the driver himself/ herself can judge his/her driving.

Further, with this type of navigation system, the driver can see or hear the area information relating to the recommended route on which he/she is driving. This gives the driver the assurance of driving on the recommended route, and thus he/she can feel better about driving.

Still further, with such a navigation system, the driver is provided with information about the destination and there around after reaching the destination. Such information helps the driver get to know the area easily even if he/she is new to the area.

While the invention has been described in detail, the foregoing description is in all aspects illustrative and not restrictive. It is understood that numerous other modifications and variations can be devised without departing from the scope of the invention.

What is claimed is:

1. An on-vehicle navigation system for providing guidance with at least one of one or more characters and one or more symbols and not a map display, said on-vehicle navigation system comprising:
   a data storage section operable to store map data;
   an input section operable to receive a destination;
   a position detection section operable to detect a current position of a vehicle;
   a route search section operable to find a recommended route from the current position to the destination using the map data;
   a guidance data generation section operable to generate, from the map data and the recommended route, guidance data for the guidance;
   a guidance section operable to provide the guidance based on the guidance data and the current position; and
   an output section operable to generate at least one of a display output using the at least one of the one or more characters and the one or more symbols and a sound output about the guidance provided by said guidance section, wherein
   when the current position of the vehicle is on the recommended route after passing a guidance point, said guidance section is operable to provide a message indicating that the vehicle is driving properly.

2. The on-vehicle navigation system according to claim 1, wherein
   said guidance section is operable to provide a message indicating that the vehicle is being driven properly by referring to a satisfaction level based on a proximity factor derived from distances from the current position of the vehicle to the recommended route, and to another route closer thereto.

3. The on-vehicle navigation system according to claim 1, wherein
   said guidance data generation section is operable to generate the guidance data including area information corresponding to a predetermined point in a vicinity of the recommended route together with guidance information for the guidance, and
   when the vehicle passes by the predetermined point, said guidance section is operable to further provide the guidance based on the area information.

4. The on-vehicle navigation system according to claim 1, wherein
   said guidance data generation section is operable to generate the guidance data including predetermined destination information about the destination and therearound together with guidance information for the guidance, and
   when the vehicle reaches the destination, said guidance section is operable to further provide the guidance based on the destination information.

5. The on-vehicle navigation system according to claim 1, wherein
   said guidance data generation section is operable to generate the guidance data including area information corresponding to a predetermined point in a vicinity of the recommended route, and predetermined destination information about the destination and therearound together with guidance information for the guidance, and
   said guidance section is operable to further provide the guidance based on the area information when the vehicle passes by the predetermined point, and the guidance based on the destination information when the vehicle reaches the destination.

6. An on-vehicle navigation system for providing guidance with at least one of one or more characters and one or more symbols and not a map display, said on-vehicle navigation system comprising:
   a data storage section operable to store map data;
   an input section operable to receive a destination;
   a position detection section operable to detect a current position of a vehicle;
   a route search section operable to find a recommended route from the current position to the destination using the map data;
   a guidance data generation section operable to generate, from the map data and the recommended route, guidance data comprising guidance information for the guidance, and area information corresponding to a predetermined point in a vicinity of the recommended route;

a guidance section operable to provide the guidance based on the guidance data and the current position; and an output section operable to generate at least one of a display output using the at least one or more characters and the at least one or more symbols and a sound output about the guidance provided by said guidance section, wherein said guidance section is operable to provide the guidance according to the area information when the vehicle passes by the predetermined point.

7. An on-vehicle navigation system for providing guidance with at least one of one or more characters and one or more symbols and not a map display, said on-vehicle navigation system comprising:

a data storage section operable to store map data;

an input section operable to receive a destination;

a position detection section operable to detect a current position of a vehicle;

a route search section operable to find a recommended route from the current position to the destination using the map data;

a guidance data generation section operable to generate, from the map data and the recommended route, guidance data comprising guidance information for the guidance, and predetermined destination information about the destination and therearound;

a guidance section operable to provide the guidance based on the guidance data and the current position; and an output section operable to generate at least one of a display output using the at least one of the one or more characters and the at least one or more symbols and a sound output about the guidance provided by said guidance section, wherein said guidance section is operable to provide the guidance according to the destination information when the vehicle reaches the destination.

* * * * *